United States Patent
Ishii et al.

(10) Patent No.: US 7,725,121 B2
(45) Date of Patent: May 25, 2010

(54) MOBILE COMMUNICATION SYSTEM, WIRELESS BASE STATION, RADIO NETWORK CONTROLLER, AND POWER CONTROL METHOD

(75) Inventors: Hiroyuki Ishii, Yokosuka-shi (JP); Takehiro Nakamura, Yokohama-shi (JP)

(73) Assignee: NTT DoCoMo, Inc., Tokyo (JP)

( * ) Notice: Subject to any disclaimer, the term of this patent is extended or adjusted under 35 U.S.C. 154(b) by 717 days.

(21) Appl. No.: 11/330,346

(22) Filed: Jan. 12, 2006

(65) Prior Publication Data

US 2006/0172758 A1 Aug. 3, 2006

(30) Foreign Application Priority Data

Jan. 13, 2005 (JP) .......................... P2005-006791

(51) Int. Cl.
*H04Q 7/20* (2006.01)
(52) U.S. Cl. .................. 455/522; 455/501; 455/500; 455/517; 455/69; 455/436; 370/328; 370/329; 370/331; 370/332; 370/333
(58) Field of Classification Search .................. 455/522, 455/501, 500, 69, 68, 422.01, 403, 550.1, 455/436–444, 517, 445, 426.1, 426.2, 560, 455/561, 466, 67.11, 513, 515; 370/310, 370/331, 332, 333, 328, 329
See application file for complete search history.

(56) References Cited

U.S. PATENT DOCUMENTS

| | | | |
|---|---|---|---|
| 5,991,285 A | 11/1999 | Ghosh | |
| 6,085,108 A | 7/2000 | Knutsson et al. | |
| 6,415,149 B1 | 7/2002 | Bevan et al. | |
| 6,628,958 B1 * | 9/2003 | Kamel et al. | 455/522 |
| 6,650,905 B1 * | 11/2003 | Toskala et al. | 455/522 |
| 2003/0130002 A1 | 7/2003 | Chen et al. | |
| 2004/0203782 A1 * | 10/2004 | Peng et al. | 455/436 |
| 2005/0170786 A1 * | 8/2005 | Chen et al. | 455/69 |
| 2005/0277419 A1 * | 12/2005 | Takano et al. | 455/442 |
| 2007/0155388 A1 * | 7/2007 | Petrovic et al. | 455/442 |

FOREIGN PATENT DOCUMENTS

| | | |
|---|---|---|
| EP | 1 204 219 A2 | 5/2002 |
| EP | 1 207 711 A2 | 5/2002 |
| EP | 1 583 256 A1 | 10/2005 |
| JP | 2003-60568 | 2/2003 |
| JP | 2003-234697 | 3/2003 |

(Continued)

OTHER PUBLICATIONS

"Dedicated downlink physical channels", 3GPP TS 25.211, V5.6.0, Release 5, Sep. 2004, pp. 19-25.

(Continued)

*Primary Examiner*—Keith T Ferguson
(74) *Attorney, Agent, or Firm*—Oblon, Spivak, McClelland, Maier & Neustadt, L.L.P.

(57) ABSTRACT

A mobile communication system includes wireless base stations, a mobile station communicating with the wireless base stations, and a radio network controller controlling the wireless base stations. The mobile communication system includes a power controller which controls a power of control bits in downlink based on the number of wireless base stations simultaneously communicating with the mobile station.

14 Claims, 9 Drawing Sheets

FOREIGN PATENT DOCUMENTS

| | | |
|---|---|---|
| JP | 2003-244071 | 3/2003 |
| JP | 2003-348012 | 12/2003 |
| JP | 2004-112761 | 4/2004 |
| WO | WO 2004/059872 A1 | 7/2004 |
| WO | WO 2005/002083 A1 | 1/2005 |

OTHER PUBLICATIONS

"Power control", 3GPP TS 25.214, V5.9.0, Release 5, Jun. 2004, pp. 13-30.

U.S. Appl. No. 11/911,596, filed Oct. 15, 2007, Ishii, et al.
U S. Appl. No. 11/911,607, filed Oct. 15, 2007, Ishii, et al.
U.S. Appl. No. 10/820,814, filed Apr. 9, 2004, Ishii, et al.
U.S. Appl. No. 11/331,200, filed Jan. 13, 2006, Ishii, et al.
Oscar Salonaho, et al., "Flexible Power Allocation for Physical Control Channel in Wideband CDMA", Vehicular Technology Conference, IEEE, vol. 2, May 16, 1999, pp. 1455-1458.

* cited by examiner

MOBILE COMMUNICATION SYSTEM, WIRELESS BASE STATION, RADIO NETWORK CONTROLLER, AND POWER CONTROL METHOD

CROSS REFERENCE TO RELATED APPLICATIONS

This application is based upon and claims the benefit of priority from prior Japanese Patent Application P2005-006791 filed on Jan. 13, 2005; the entire contents of which are incorporated by reference herein.

BACKGROUND OF THE INVENTION

1. Field of the Invention

The present invention relates to a mobile communication system, a wireless base station, a radio network controller, and a power control method.

2. Description of the Related Art

In a mobile communication system, generally, multipath fading or the like causes instantaneous level fluctuations on a receiver side, sometimes drastically degrading reception characteristics of uplink in a wireless base station or reception characteristics of downlink in a mobile station. As a technology to reduce such degradation, in a mobile communication system using CDMA, transmission power control is individually performed for uplink and downlink.

Hereinafter, an outline of the transmission power control in uplink is shown (for example, see 3GPP, "TS25.211 V5.6.0 Physical channels and mapping of transport channels onto physical channels (FDD)" and 3GPP, "TS25.214 V5.9.0 Physical layer procedures (FDD)"). FIG. 1 shows a configuration of transmission power control loops based on SIR measurement. The transmission power control includes two loops of inner and outer loops. In the inner loop, SIR of a received signal at each slot is measured by a SIR measurement unit 17. Transmission power control (TPC) bits to control an increase and a decrease of transmission power are created in a TPC command creation unit 19 so that the measured SIR value is equal to a target SIR value. The created TPC bits are transmitted on a dedicated physical control channel DPCCH in paired link (downlink when controlling the transmission power in uplink). On the other hand, the same target SIR value does not always provide same reception quality (BLER or BER) depending on differences in the number of propagation paths, a propagation environment such as moving speed of the mobile station (maximum Doppler frequency), and the SIR measurement method. Accordingly, in a BLER measurement unit 14, the reception quality is measured through the outer loop for a longer interval, and the target SIR value is corrected in a target SIR correction value creation unit 16 in long cycles based on the measured reception quality. For example, when the outer loop control is performed based on BLER, BLER is measured based on the number of transport blocks in a data series whose calculated CRC results are correct after error correction decoding, and a correction value of the target SIR value is obtained so that this measured BLER value is equal to a required BLER value.

Herein, FIG. 2 shows a frame structure of dedicated physical channel DPCH composed of DPCCH as a downlink dedicated physical channel for notification of the transmission power control bits and DPDCH as a dedicated physical data channel. A portion indicated by "TPC" includes the aforementioned transmission power control bits. A portion indicated by "TFCI" is called a transport format combination indicator and includes information indicating a transport format combination. A portion indicated by "Pilot" includes dedicated pilot bits. The power of these three pieces of information, i.e. TPC bits, TFCI bits, and Pilot bits, is set to the value which is equal to "DPDCH power+power offset". The power-offset values are signaled through an upper layer.

When the mobile station communicates with a plurality of wireless base stations, the plurality of wireless base stations individually perform the transmission power control and send transmission control bit patterns using the downlink DPCCH. At this time, in uplink, the reception quality of at least one of the above plurality of wireless base stations should meet required quality. Accordingly, the mobile station reduces the transmission power when at least one of the transmission power control bit patterns of the downlink indicates a power reduction command to reduce power. The mobile station increases the transmission power only when all the transmission power control bit patterns indicate a power increase command to increase power.

As described above, generally, in the case of communicating with a plurality of wireless base stations, the mobile station increases the transmission power only when each of the transmission power control bit patterns from the above plurality of wireless base stations indicates the power increase command and reduces the transmission power when any one of the transmission power control bit patterns indicates the power reduction command. Herein, there are no problems when an error rate of the transmission power control bits is 0%. However, actually, the error rate of the transmission power control bits is not 0%, and errors could occur. In this case, when any one of the power increase commands is mistaken for the power reduction command, the mobile station reduces the transmission power. The transmission power of the mobile station tends to be smaller than the required transmission power as a whole. This results in degradation in the uplink reception quality in the wireless base stations.

In the light of the aforementioned problem, an object of the present invention is to provide a mobile communication system, a wireless base station, a radio network controller, and a power control method capable of reducing the error rate of the transmission power control bits and maintaining uplink reception quality of each wireless base station.

SUMMARY OF THE INVENTION

A first aspect of the present invention is to provide a mobile communication system including wireless base stations, a mobile station communicating with the wireless base stations, and a radio network controller controlling the wireless base stations, the mobile communication system, including a power controller which controls a power of control bits in downlink based on the number of wireless base stations simultaneously communicating with the mobile station.

A second aspect of the present invention is to provide a wireless base station communicating with a mobile station and controlled by a radio network controller, the wireless base station, including a power controller which controls a power of the control bits in the downlink based on the number of wireless base stations simultaneously communicating with the mobile station.

A third aspect of the present invention is to provide a radio network controller controlling wireless base stations, which communicate with a mobile station, the radio network controller, including a power controller which controls a power of the control bits in downlink based on the number of wireless base stations simultaneously communicating with the mobile station.

A forth aspect of the present invention is to provide a power control method in a mobile communication system composed of wireless base stations, a mobile station communicating with the wireless base stations, and a radio network controller controlling the wireless base station, the power control method, including controlling a power of control bits in downlink based on the number of wireless base stations simultaneously communicating with the mobile station.

DETAILED DESCRIPTION OF THE INVENTION

Figure 1:
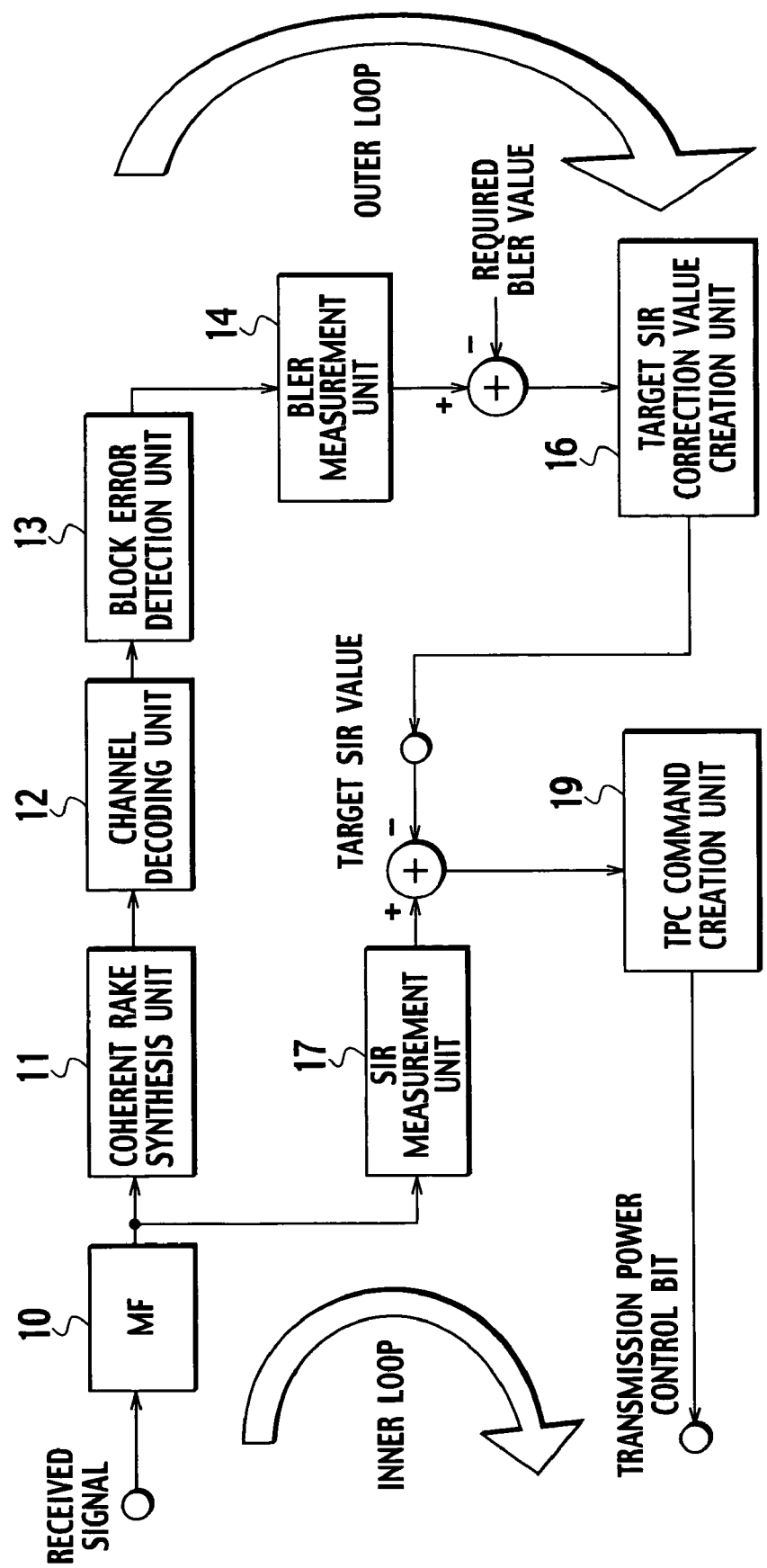
FIG. 1 is a diagram showing an example of a configuration of conventional transmission power control loops based on SIR measurement.
Figure 2:
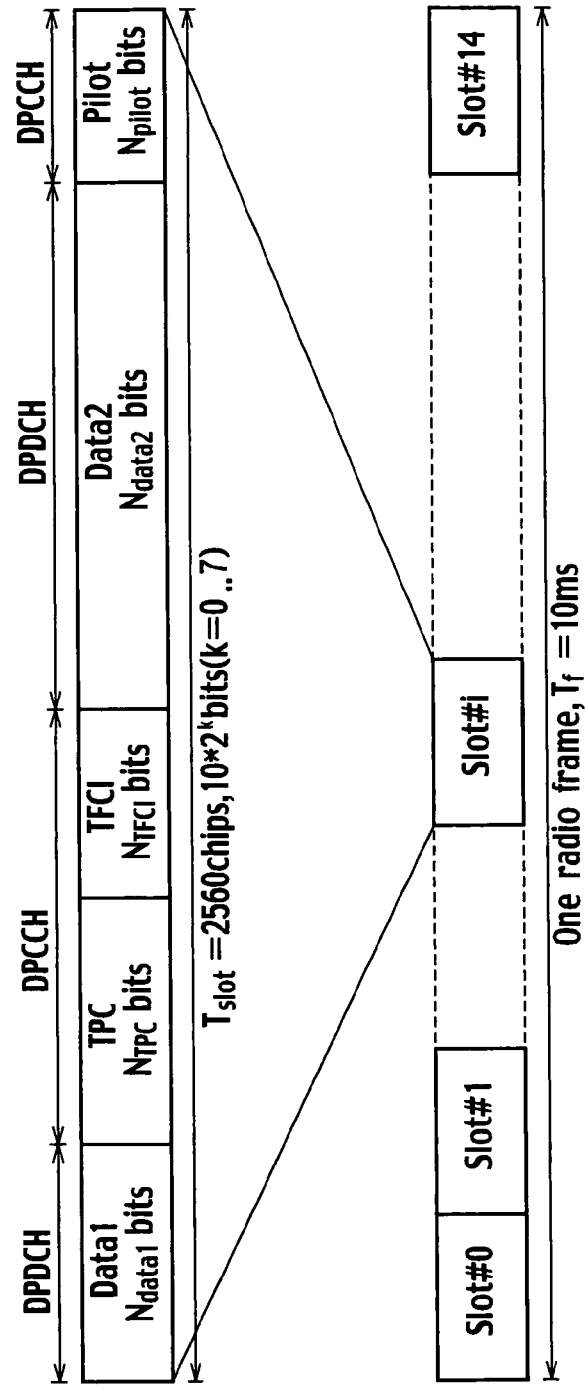
FIG. 2 is a diagram showing a frame structure of a conventional dedicated physical channel DPCH.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 3:
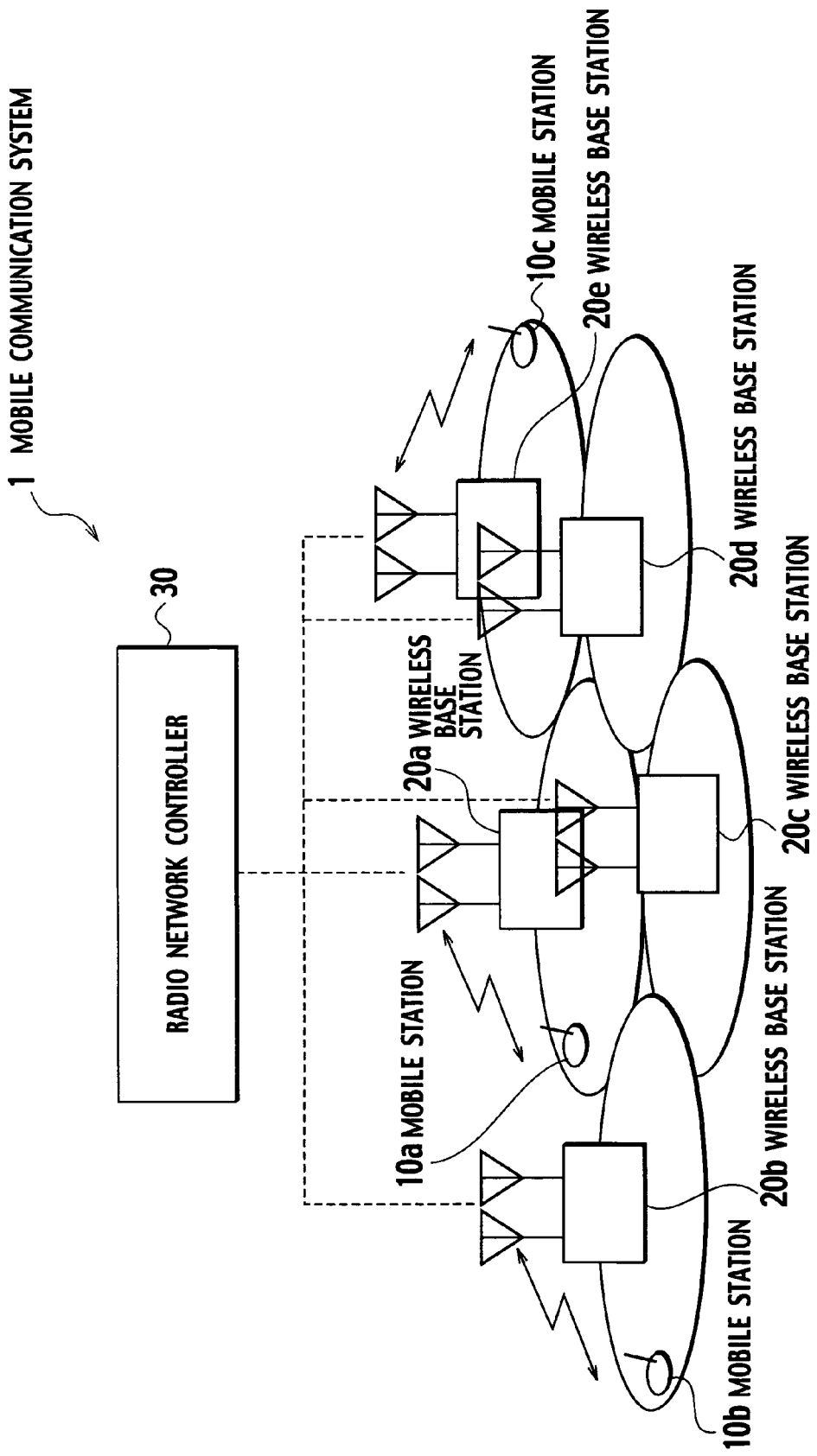
FIG. 3 is a block diagram of a mobile communication system according to first to fourth embodiments.

FIG. 3 shows an example of the configuration of a mobile communication system 1 to which the present invention is applied. As shown in the drawing, the present invention assumes a mobile communication system including a plurality of wireless base stations 20a, 20b, 20c, 20d, and 20e, a plurality of mobile stations 10a, 10b, and 10c communicating with the wireless base stations, and a radio network controller 30 controlling the plurality of wireless base stations.

First Embodiment

In a first embodiment, a description is given of a mobile communication system and a power control method in which power of control bits in downlink when the number of wireless base stations simultaneously communicating with each mobile station is one is controlled to be smaller than that when the number of wireless base stations simultaneously communicating with the mobile station is two or more.

(Mobile Communication System)

As shown in FIG. 3, a mobile communication system according to the first embodiment includes the plurality of mobile stations 10a, 10b, and 10c, the plurality of wireless base stations 20a, 20b, 20c, 20d, and 20e, and the radio network controller 30.

Figure 4:
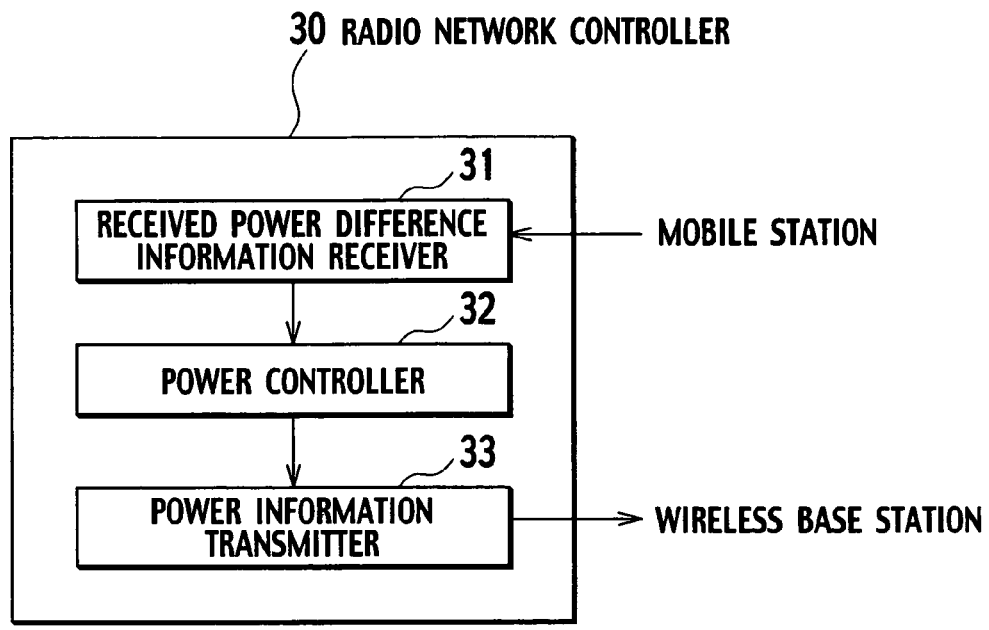
FIG. 4 is a block diagram of a radio network controller according to the first to fourth embodiments.

As shown in FIG. 4, the radio network controller 30 includes a received power difference information receiver 31, a power controller 32, and a power information transmitter 33.

The received power difference information receiver 31 receives a notification from each mobile station in communication with a plurality of the wireless base stations that the difference in received signal power from each wireless base station exceeds a predetermined threshold value. The received power difference information receiver 31 also receives a notification from the mobile station in communication with a single one of the wireless base stations that the difference in received signal power from each wireless base station has been reduced to a predetermined threshold value or less.

The power controller 32 controls the number of wireless base stations simultaneously communicating with each mobile station based on the information received by the received power difference information receiver 31 and accordingly recognizes the number of wireless base stations simultaneously communicating with the mobile station. The power controller 32 controls power of control bits in downlink based on the recognized number of wireless base stations. Specifically, the power controller 32 controls and sets the power of the control bits in the downlink when the number of wireless base stations simultaneously communicating with the mobile station is one to be smaller than that when the number of wireless base stations simultaneously communicating with the mobile station is two or more. The control method is described in more detail later in (Power Control Method).

The power information transmitter 33 transmits power information controlled by the power controller 32 to each wireless base station.

Figure 5:
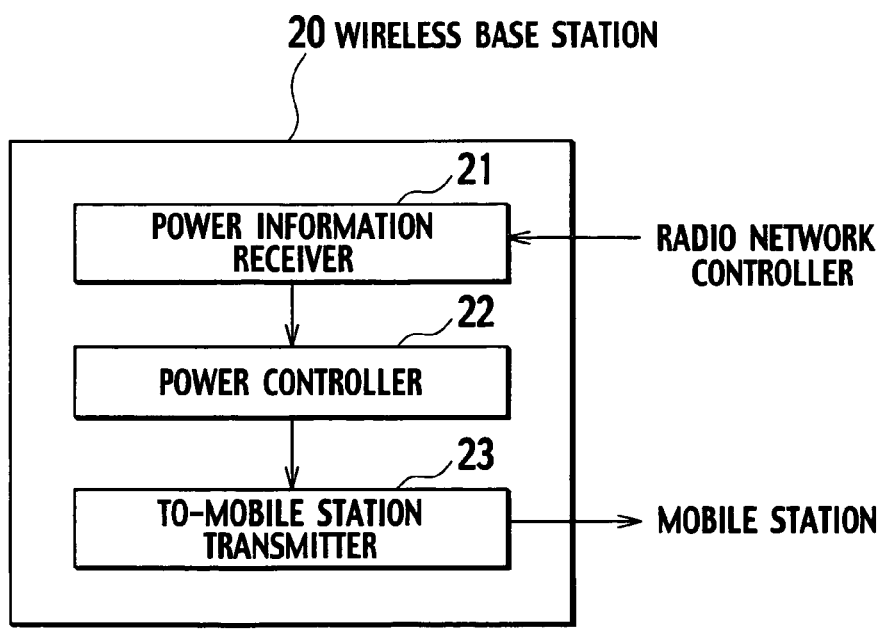
FIG. 5 is a block diagram of a wireless base station according to the first to fourth embodiments.

As shown in FIG. 5, each of the wireless base stations 20 includes a power information receiver 21, a power controller 22, and a to-mobile station transmitter 23.

The power information receiver 21 receives the power information transmitted by the power information transmitter 33 of the radio network controller 30.

The power controller 22 controls the power of the control bits in the downlink based on the information received by the power information receiver 21, that is, based on the number of wireless base stations simultaneously communicating with each mobile station.

The to-mobile station transmitter 23 communicates with each mobile station using the power information controlled by the power controller 22.

(Power Control Method)

Figure 6:
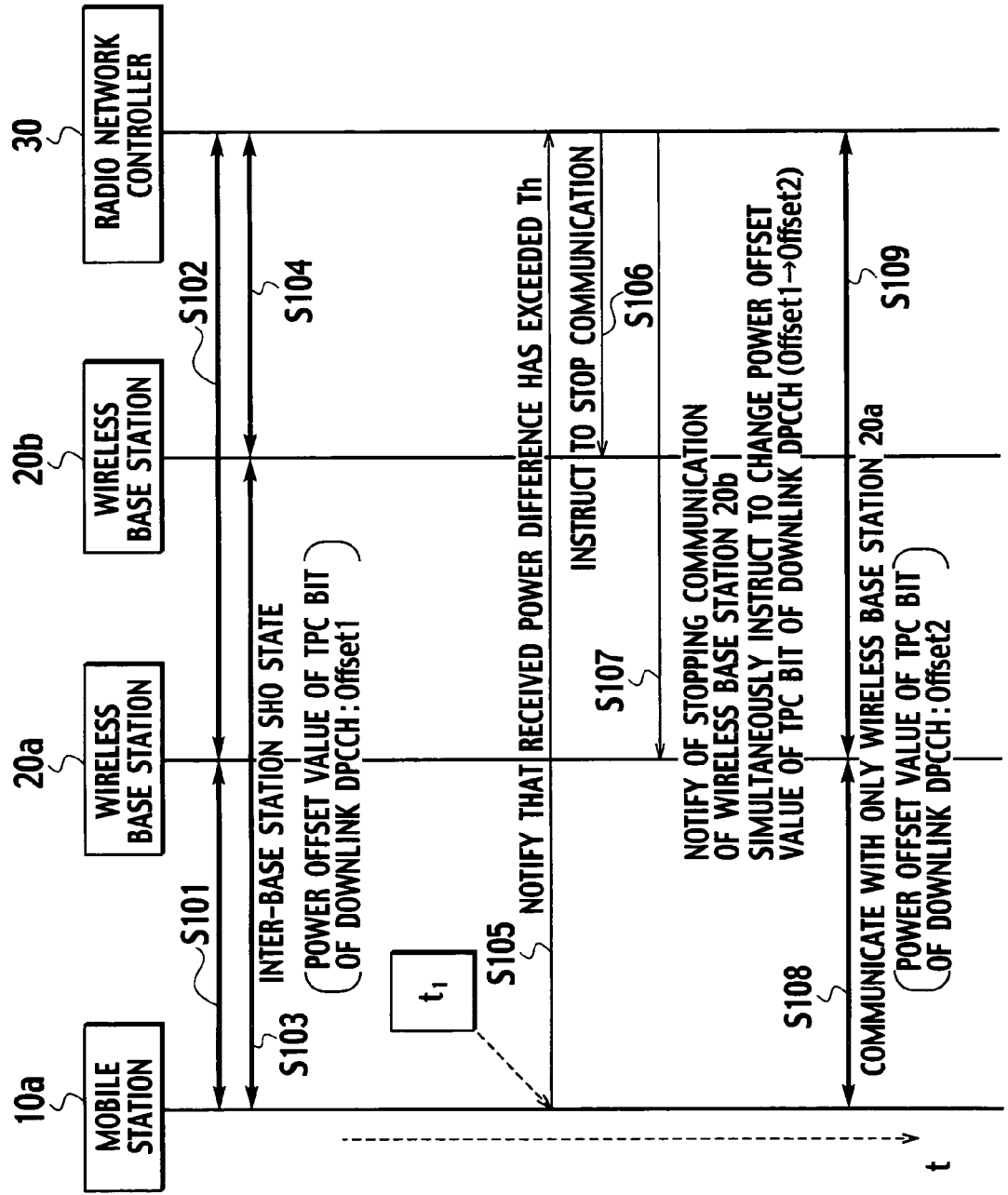
FIG. 6 is a sequence diagram (No. 1) showing a power control method according to the first embodiment.
Figure 8:
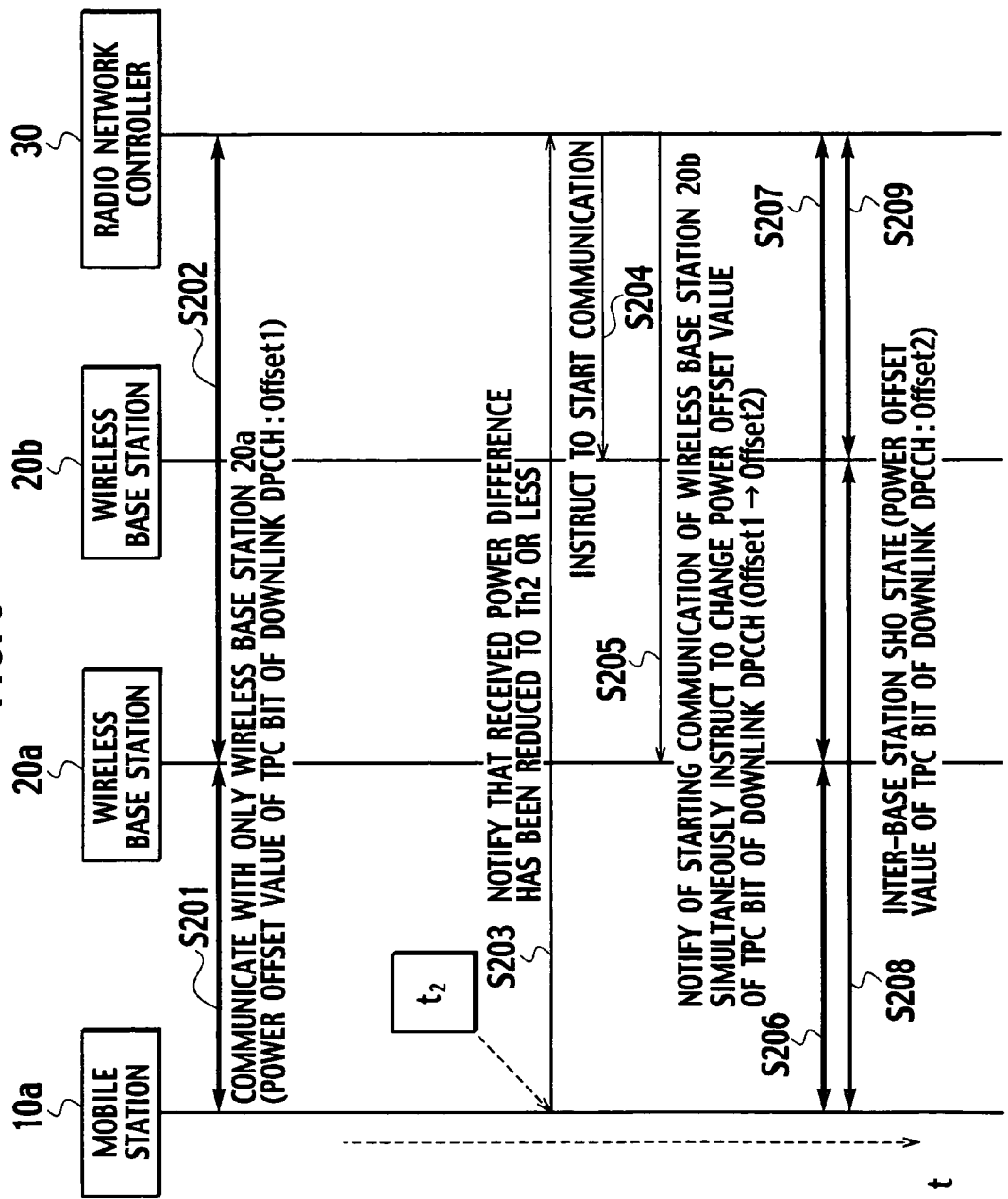
FIG. 8 is a sequence diagram (No. 2) showing a power control method according to the first embodiment.

Next, a description is given of a power control method according to the first embodiment using FIGS. 6 and 8.

FIG. 6 is a sequence diagram when a state (hereinafter, referred to as "inter-base station SHO state") where the mobile station is in communication with a plurality of the wireless base stations is changed into a state where the mobile station is in communication with a single one of the wireless base stations. FIG. 8 is a sequence diagram when the state where the mobile station is in communication with the single wireless base station is changed into the inter-base station SHO state. In FIGS. 6 and 8, thick arrows indicate communication states in respective communication channels, and thin arrows indicate processing or notification according to the control of the present invention.

First, in FIG. 6, the mobile station 10*a* is in the inter-base station SHO state and is exchanging radio signals with the wireless base stations 20*a* and 20*b* (steps S101 and S103). The wireless base stations 20*a* and 20*b* are in communication with the radio network controller 30 (steps S102 and S104). At this time, the power offset value of the transmission power control bits (TPC bits) of the downlink DPCCH is set to Offset1. FIG. 6 shows as an example that the mobile station exchanges radio signals with the two wireless base stations, but it is obvious that the mobile station may exchange radio signals with three or more wireless base stations.

Figure 7:
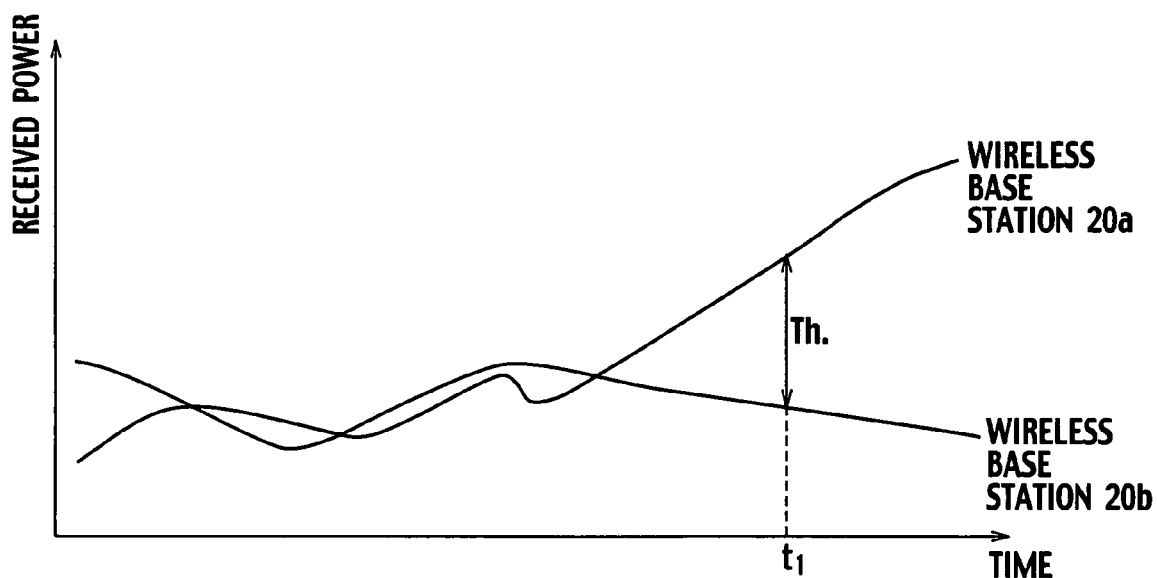
FIG. 7 is a graph showing a transition of power received from wireless base stations in FIG. 6.

Next, the mobile station 10*a* detects that the difference between signal powers received from the two wireless base stations 20*a* and 20*b* has exceeded a predetermined threshold value Th and notifies the radio network controller 30 (step S105). Examples of the transitions of the signal powers of common pilot channels received by the mobile station 10*a* from the wireless base station 20*a* and 20*b* are shown in FIG. 7. FIG. 7 shows that the difference between the signal powers received from the two wireless base stations 20*a* and 20*b* exceeds the predetermined threshold value Th at the time t1.

In the above example, the mobile station 10*a* measures the difference between the signal powers received from the wireless base stations 20*a* and 20*b*, detects this difference exceed the threshold value Th, and then notifies the radio network controller 30. However, instead of the above received signal powers, path losses of signals from the wireless base stations 20*a* and 20*b* or Ec/N0 of the common pilot signals from the wireless base stations 20*a* and 20*b* may be used.

Next, at the time t1, the radio network controller 30 notified by the mobile station 10*a* instructs the wireless base station with lower received signal power (herein, the wireless base station 20*b*) to stop communication with the mobile station 10*a* (step S106).

Since the mobile station 10*a* continues to communicate with only the wireless base station 20*a*, the radio network controller 30 notifies the wireless base station 20*a* that the communication between the mobile station 10*a* and the wireless base station 20*b* is stopped and instructs the base station 20*a* to change the power offset value of the TPC bits of the downlink DPCCH from Offset1 to Offset2 (step S107). The wireless base station 20*a* then sets the power offset value of the TPC bits of the downlink DPCCH to the Offset2. Herein, the radio network controller 30 may notify not only the wireless base station 20*a* but also the mobile station 10*a* of the change of the power-offset value.

Herein, the TPC bit error rate needs to be smaller when the mobile station is in the inter-base station SHO state. Accordingly, the Offset1 is set larger than the Offset2 in FIG. 6. The Offset1 and Offset2 may be changed depending on the number of base stations communicating with the mobile station 10*a*. In the above example, the Offset1 is set larger than that of the Offset2, but the Offset1 may be set smaller than the Offset2 by contrast.

In this way, the mobile station 10*a* exchanges radio signals with the single wireless base station 20*a* (step S108), the wireless base station 20*a* communicates with the radio network controller 30 (step S109).

In the above example, the power offset value of the TPC bits is controlled according to the number of base stations communicating with the mobile station, but a similar control may be performed in terms of not only the TPC bits but also Pilot bits and TFCI bits. If the power offset value of the Pilot bits is set larger when the mobile station is in the inter-base station SHO state, for example, the downlink transmission power control provides higher accuracy. This results in an improvement in the downlink reception quality of the mobile station and an improvement in the reception quality of the TPC bits.

Next, a description is given of FIG. 8.

In FIG. 8, the mobile station 10*a* is exchanging radio signals with only the wireless base station 20*a* (step S201), and the wireless base station 20*a* is in communication with the radio network controller 30 (step S202). At this time, the power offset value of the TPC bits of the downlink DPCCH is set to the Offset1.

Figure 9:
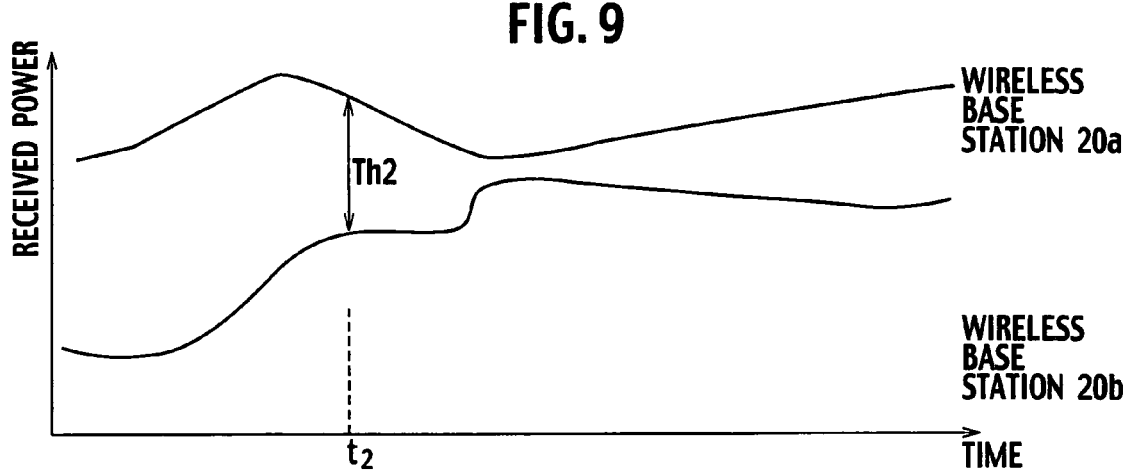
FIG. 9 is a graph showing a transition of power received from wireless base stations in FIG. 8.

Next, the mobile station 10*a* detects at time t2 that the difference between the signal powers received from the two wireless base stations 20*a* and 20*b* has been reduced to a predetermined threshold value Th2 and notifies the radio network controller 30 (step S203). Examples of the transitions of the signal powers of the common pilot channels received by the mobile station 10*a* at this time from the wireless base stations 20*a* and 20*b* are shown in FIG. 9. FIG. 9 shows that the difference between the signal powers received from the two wireless base stations 20*a* and 20*b* is reduced to the predetermined threshold value Th2 at the time t2.

In the above example, the mobile station 10*a* measures the difference between the signal powers received from the wireless base stations 20*a* and 20*b*, detects this difference been reduced to the threshold value Th2 or less, and then notifies the radio network controller 30. However, instead of the above received signal powers, the path losses of signals from the wireless base stations 20*a* and 20*b* or Ec/N0 of the common pilot signals from the wireless base stations 20*a* and 20*b* may be used.

Next, at the time t2, the radio network controller 30 notified by the mobile station 10*a* instructs a wireless base station with the above difference reduced to the threshold value Th2 or less (herein, the wireless base station 20*b*) to start communication with the mobile station 10*a* (step S204). At this time, the radio network controller 30 notifies the wireless base station 20*b* that the power offset value of the TPC bits of the downlink DPCCH is set to the Offset2.

Since the mobile station 10*a* begins to communicate with both the wireless base stations 20*a* and 20*b*, the radio network controller 30 notifies the wireless base station 20*a* that the communication between the mobile station 10*a* and the wireless base station 20*b* is started and simultaneously instructs the base station 20*a* to change the power offset value of the TPC bits of the downlink DPCCH from the Offset1 to the Offset2 (step S205). The wireless base station 20*a* then sets the power offset value of the TPC bits of the downlink DPCCH to the Offset2. Herein, the radio network controller 30 may notify not only the wireless base station 20*a* but also the mobile station 10*a* of the change of the power-offset value. FIG. 8 shows as an example that the mobile station exchanges signals with two wireless base stations, but it is obvious that the mobile station may exchange signals with three or more wireless base stations.

Herein, the TPC bit error rate needs to be smaller when the mobile station is in the inter-base station SHO state. Accordingly, the Offset2 is set larger than the Offset1 in FIG. 8. The Offset1 and Offset2 may be changed depending on the number of base stations in communication with the mobile station. In the above example, the Offset2 is set larger than the Offset1, but the Offset2 may be set smaller than the Offset1 by contrast.

In this way, the mobile 10*a* is brought into the inter-base station SHO state and exchanges radio signals with the wireless base stations 20*a* and 20*b* (steps S206 and S208), and the wireless base stations 20a and 20b communicate with the radio network controller 30 (steps S207 and S209).

In the above example, the power offset value of the TPC bits is controlled according to the number of wireless base stations communicating with the mobile station, but a similar control may be performed in terms of not only the TPC bits but also the Pilot bits and TFCI bits. For example, if the power-offset value of the Pilot bits is set larger when the mobile station is in the inter-base station SHO state, the downlink transmission power control provides higher accuracy. This results in an improvement the downlink reception quality of the mobile station and an improvement in the reception quality of the TPC bits.

(Operation and Effect)

With the mobile communication system, wireless base station, radio network controller, and power control method according to the first embodiment, the power of the downlink control bits when the number of wireless base stations simultaneously communicating with the mobile station is two or more is controlled to be larger than that when the number of wireless base stations simultaneously communicating with the mobile station is one. It is therefore possible to reduce the error rate of the transmission power control bits and thus maintain the uplink reception quality of the wireless base stations.

Moreover, the power offset value of the TPC bits is set larger while the inter-base station SHO is carried out and set smaller at the same time when the mobile station begins to perform communication on a single link. Accordingly, it is possible to effectively use a power resource while carrying out a stable operation even in the inter-base station SHO state.

The downlink control bits for the power control according to the first embodiment can be the information bits (TPC bits) used for transmission power control in uplink, pilot bits (Pilot bits) specific to each mobile station, the information bits (TFCI bits) indicating the transport format combination, or the like.

Note that, in the above description, the step S106, S107 of FIG. 6 and the step S204, S205 of FIG. 8 can be equivalent to RADIO LINK SETUP REQUEST or RADIO LINK RECONFIGURATION PREPARE of NBAP signals in 3GPP. The power-offset values can be equivalent to P01 about TFCI bits, to P02 about TPC bits, and to P03 about dedicated pilot bits.

Second Embodiment

In the first embodiment, the description is made of the example related to a general channel, and in the second embodiment, a description is given of a mobile communication system and a power control method in which whether to perform the power control described in the first embodiment is determined according to a downlink channel type.

(Mobile Communication System)

As shown in FIG. 4, the radio network controller 30 according to the second embodiment includes the received power difference information receiver 31, power controller 32, and power information transmitter 33.

The power controller 32 controls the power of the downlink control bits based on the number of wireless base stations simultaneously communicating with the mobile station of interest and determines according to the downlink channel type whether to perform the power control. Examples of the downlink channel type are a dedicated channel associated with a shared channel and the like.

The second embodiment is the same as the first embodiment in terms of the other functions of the radio network controller 30, the mobile stations, and the wireless base stations, and the description thereof is omitted here.

(Power Control Method)

Figure 10:
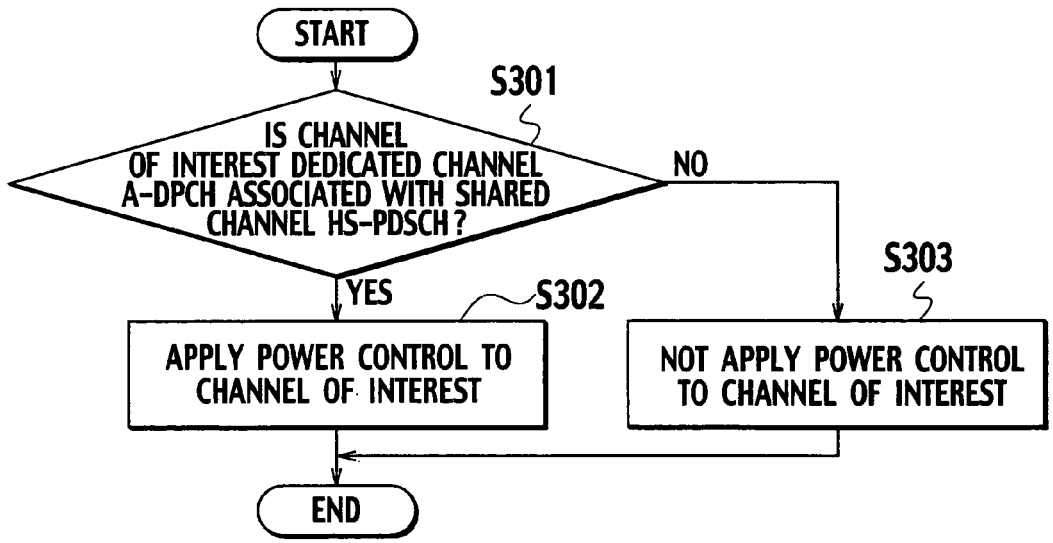
FIG. 10 is a flowchart showing a power control method according to the second embodiment.

Next, a description is given of a power control method according to the second embodiment using FIG. 10. Herein, a description is given of an example in which the power control method according to the present invention is not applied to a dedicated channel but applied to an associated dedicated physical channel A-DPCH associated with HS-PDSCH (HS-DSCH for a transport channel) as a HSDPA type shared physical channel in a high-speed packet transmission system.

First, in step S301, the radio network controller 30 determines whether the channel of interest is the associated dedicated channel A-DPCH associated with HS-PDSCH (HS-DSCH for the transport channel), which is a shared physical channel. For example, when the radio network controller 30 is notified by the mobile station in the step S105 of FIG. 6 or the step S203 of FIG. 8, the channel type is determined. When the channel of interest is the dedicated channel A-DPCH, the procedure proceeds to step S302, and when the channel is not the dedicated channel A-DPCH, the procedure proceeds to step S303.

Next, in the step S302, the wireless control station 30 applies the power control according to the present invention to the channel of interest. For example, the change of the power offset value of the TPC bits performed in the steps S106 and S107 of FIG. 6 or in the steps S204 and S205 of FIG. 8 is performed.

On the other hand, in the step S303, the radio network controller 30 does not apply the power control according to the present invention to the channel of interest. For example, the change of the power offset value of the TPC bits performed in the steps S106 and S107 of FIG. 6 or in the steps S204 and S205 of FIG. 8 is not performed.

Herein, the above description shows the example in which the power control according to the present invention is applied to a channel, which is the dedicated channel associated with HS-PDSCH, which is a shared physical channel, and not applied to a channel which is a general dedicated channel. However, the determination whether to apply the power control according to the present invention may be controlled according to a channel type other than that in the above example.

In addition, the values of the Offset1 and Offset2, which are described in the first embodiment, may be adjusted according to the channel type as well as the determination whether to apply the power control. For example, the control may be made so that when the channel of interest is the dedicated channel associated with HS-PDSCH, which is a shared physical channel, the Offset1 is set larger, and when the channel of interest is a general dedicated channel, the Offset1 is set smaller.

(Operation and Effect)

In a conventional case where the mobile station is in communication with the wireless base stations using HSDPA, which is a downlink shared packet communication method, communication is carried out in downlink of the HSDPA using as physical channels, HS-PDSCH, which is a shared data channel, HS-SCCH, which is a shared control channel, and A-DPCH, which is an associated dedicated channel, and is carried out in uplink using A-DPCH, which is an associated dedicated channel, and HS-DPCCH, which is a dedicated control channel for HSDPA. Accordingly, the transmission power control bits for transmission power control of the uplink A-DPCH are transmitted using DPCCH in the downlink A-DPCH. Herein, generally in downlink, data bits are transmitted mainly through HS-PDSCH and less frequently transmitted through the downlink A-DPCH. On the other hand, in uplink, data bits are transmitted mainly through A-DPCH. Accordingly, in the HSDPA system, bit rates of the uplink and downlink A-DPCHs are unbalanced in many cases. Specifically, power of the downlink A-DPCH is smaller in many cases. This causes more degradation of the uplink reception quality in the wireless base stations due to an error of the aforementioned transmission power control bits in the downlink A-DPCH.

With the mobile communication system, wireless base stations, radio network controller, and power control method according to the second embodiment, in the HSDPA system, in the case of A-DPCH associated with HS-PDSCH as the shared channel, by setting larger the power offset value applied to the transmission power control bits in the above A-DPCH, the error rate of the transmission power control bits can be reduced, and the uplink reception quality of the wireless base stations can be maintained.

As described above, in the second embodiment, the control can be applied more flexibly according to the uplink channel type.

Third Embodiment

In the first embodiment, the description is made of the example related to a general channel, and in a third embodiment, a description is given of a mobile communication system and a power control method in which whether to perform the power control described in the first embodiment is determined according to a channel characteristic of uplink paired with the downlink.

(Mobile Communication System)

As shown in FIG. 4, the radio network controller 30 according to the third embodiment includes the received power difference information receiver 31, power controller 32, and power information transmitter 33.

The power controller 32 controls the power of the control bits in the downlink based on the number of wireless base stations simultaneously communicating with each mobile station but determines whether to perform the power control according to the channel characteristic of uplink paired with the downlink. Examples of the uplink channel characteristic are a bit rate, a spreading factor as a ratio of a chip rate to a symbol rate, the number of codes, TTI (transmission time interval), and the like.

The third embodiment is the same as the first embodiment in terms of the other functions of the radio network controller 30, the mobile stations, and the wireless base stations, and the description thereof is omitted here.

(Power Control Method)

Figure 11:
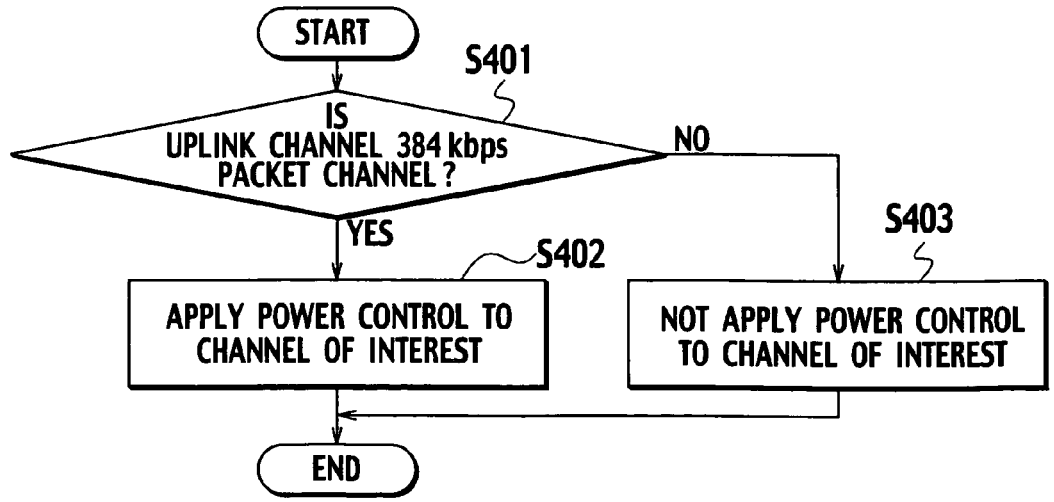
FIG. 11 is a flowchart showing a power control method according to the third embodiment.

Next, a description is given of a power control method according to the third embodiment using FIG. 11. Herein, a description is given of an example in which the power control method according to the present invention is applied when the uplink channel is a 384 kbps packet channel.

First, in step S401, the radio network controller 30 determines whether the uplink channel is the 384 kbps packet channel. For example, when the radio network controller 30 is notified by the mobile station in the step S105 of FIG. 6 or the step S203 of FIG. 8, the channel characteristic is determined. When the uplink channel is the 384 kbps packet channel, the procedure proceeds to step S402, and when the uplink channel is not the 384 kbps packet channel, the procedure proceeds to step S403.

Next, in the step S402, the radio network controller 30 applies the power control according to the present invention to the channel of interest. For example, the change of the power offset value of the TPC bits performed in the steps S106 and S107 of FIG. 6 or in the steps S204 and S205 of FIG. 8 is performed.

On the other hand, in the step S403, the radio network controller 30 does not apply the power control according to the present invention to the channel of interest. For example, the change of the power offset value of the TPC bits performed in the steps S106 and S107 of FIG. 6 or in the steps S204 and S205 of FIG. 8 is not performed.

Herein, the above description shows the example in which the power control method according to the present invention is applied to the channel of interest when the uplink channel is the 384 kbps packet channel and not applied to the channel of interest when the uplink channel is not the 384 kbps packet channel. However, the determination whether to apply the power control method according to the present invention may be controlled according to a channel characteristic other than that in the above example. For example, the control may be made according to various bit rates such as 128 and 64 kbps, in addition to 384 kbps. Moreover, the same control may be made according to not only the bit rate but also values, which define the channel such as the spreading factor, the number of codes, and TTI. Furthermore, the above control may be performed according to whether the uplink channel is an Enhanced Uplink channel.

Moreover, the values of the Offset1 and Offset2, which are described in the first embodiment, may be adjusted according to the uplink channel characteristic as well as the determination whether to apply the power control. For example, the control may be made so that the Offset1 is set larger when the uplink channel is the 384 kbps packet channel and the Offset2 is set smaller when the uplink channel is a 32 kbps packet channel.

(Operation and Effect)

With the mobile communication system, wireless base stations, radio network controller, and power control method according to the third embodiment, when the uplink channel is the 384 kbps packet channel, the power control is preformed, and the error rate of the transmission power control bits can be reduced. The uplink reception quality of each wireless base station can be therefore maintained.

As described above, in the third embodiment, the control can be applied more flexibly according to the uplink channel characteristic.

Fourth Embodiment

In the first embodiment, the description is made of the example related to a general channel, and in a fourth embodiment, a description is given of a mobile communication system and a power control method in which whether to perform the power control described in the first embodiment is determined according to whether transmission diversity control is being performed in downlink.

(Mobile Communication System)

As shown in FIG. 4, the radio network controller 30 according to the fourth embodiment includes the received power difference information receiver 31, power controller 32, and power information transmitter 33.

The power controller 32 controls the power of the control bits in the downlink based on the number of wireless base stations simultaneously communicating with each mobile station but determines whether to perform the power control according to whether the transmission diversity control is being applied to the downlink. An example of the transmission diversity control is closed-loop transmission diversity control, which controls phases of signals to be transmitted through two antennas based on feedback information notified by the mobile station.

The fourth embodiment is the same as the first embodiment in terms of the other functions of the radio network controller 30, the mobile stations, and the wireless base stations, and the description thereof is omitted here.

(Power Control Method)

Figure 12:
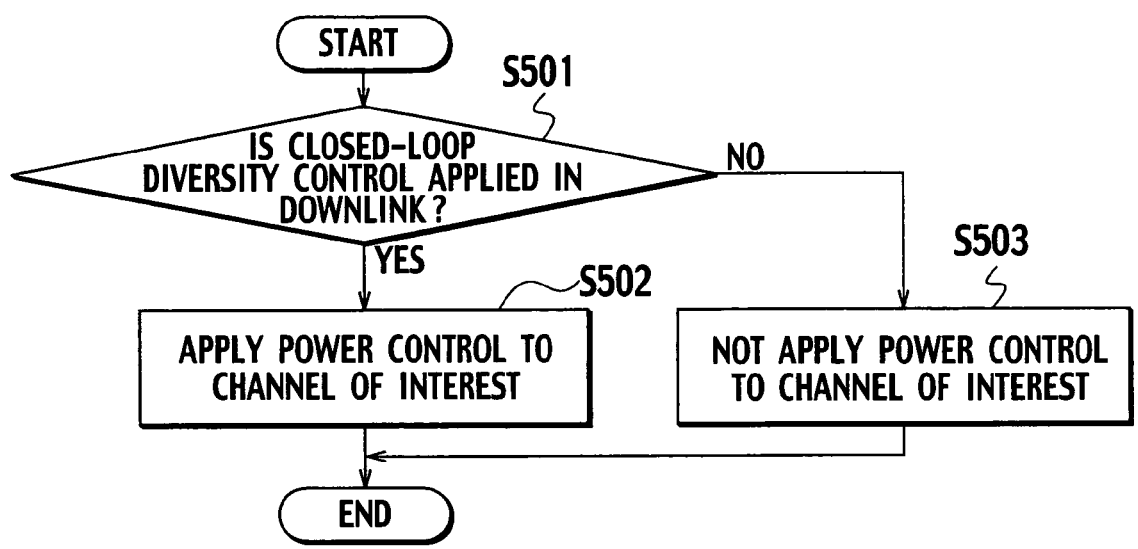
FIG. 12 is a flowchart showing a power control method according to the fourth embodiment.

Next, a description is given of a power control method according to the fourth embodiment using FIG. 12. Herein, a description is given of an example in which the power control method according to the present invention is applied when the closed-loop transmission diversity control is being applied to downlink.

First, in step S501, the radio network controller 30 determines whether the closed-loop transmission diversity control is being applied to the downlink. For example, on being notified by the mobile station in the step S105 of FIG. 6 or the step S203 of FIG. 8, the radio network controller 30 determines whether the transmission diversity control is being applied to the downlink. When the closed-loop transmission diversity control is being applied to the downlink, the procedure proceeds to step S502, and when the closed-loop transmission diversity control is not being applied to the downlink, the procedure proceeds to step S503.

Next, in the step S502, the radio network controller 30 applies the power control according to the present invention to the channel of interest. For example, the change of the power offset value of the TPC bits performed in the steps S106 and S107 of FIG. 6 or in the steps S204 and S205 of FIG. 8 is performed.

On the other hand, in the step S503, the radio network controller 30 does not apply the power control according to the present invention to the channel of interest. For example, the change of the power offset value of the TPC bits performed in the steps S106 and S107 of FIG. 6 or in the steps S204 and S205 of FIG. 8 is not performed.

Herein, the above description shows the example in which the power control method according to the present invention is applied to the channel of interest when the closed-loop transmission diversity control is being applied to downlink and not applied to the channel of interest when any other modes of the transmission diversity control is being applied. However, the determination whether to apply the power control method according to the present invention may be controlled according to a transmission diversity mode other than that of the above example. For example, the control may be made according to not only whether the closed-loop transmission diversity control is being applied but also whether open-loop transmission diversity control is being applied.

Moreover, the values of the Offset1 and Offset2, which are described in the first embodiment, may be adjusted according to whether the transmission diversity control is being carried out in the downlink as well as the determination whether to apply the power control. For example, the control may be made so that the Offset1 is set larger when the closed-loop transmission diversity control is being carried out in the downlink and the value of the Offset1 is set smaller when the closed-loop transmission diversity control is not being carried out in the downlink.

(Operation and Effect)

In carrying out the closed-loop transmission diversity control, feedback information to control downlink phases is transmitted in uplink. Accordingly, if the uplink quality is degraded, the quality of the above feedback information is degraded. The downlink phase control is therefore not normally operated, and the downlink quality is degraded. In other words, in carrying out the closed-loop transmission diversity control, it is necessary to stabilize the uplink quality more adequately than that in the case where the closed-loop transmission diversity control is not being carried out. This requires keeping high quality of the TPC bits in the downlink.

With the mobile communication system, wireless base stations, radio network controller, and power control method according to the fourth embodiment, the power control is performed when the closed-loop transmission diversity control is being applied to the downlink. The error rate of the transmission power control bits is therefore reduced, and the uplink reception quality of the wireless base station can be maintained.

As described above, in the fourth embodiment, the control can be applied more flexibly according to whether the transmission diversity control is being applied to the downlink.

Other Embodiments

The present invention has been described according to the foregoing first to fourth embodiments. However, it should be understood that the description and drawings, which partially constitute the present disclosure do not limit this invention. From this disclosure, various alternative embodiments, embodiments and operational technologies will become apparent those skilled in the art.

For example, the second embodiment describes about the high-speed packet transmission method HSDPA in 3GPP. However, the present invention is not limited to the HSDPA and can be applied to other communication methods in the mobile communication system. Examples of the other communication methods are CDMA2000 in 3GPP2, TDD, and the like.

Various modifications will become possible for those skilled in the art after receiving the teachings of the present disclosure without departing from the scope thereof.

What is claimed is:

1. A mobile communication system including wireless base stations, a mobile station communicating with the wireless base stations, and a radio network controller controlling the wireless base stations, the mobile communication system comprising:

a power controller which controls a power of control bits in downlink based on the number of wireless base stations simultaneously communicating with the mobile station, the power controller being configured to determine whether to perform the power control according to a channel type of the downlink, the channel type being a dedicated channel associated with a shared channel, and to apply the power control to the dedicated channel associated with the shared channel.

2. The mobile communication system of claim 1, wherein the control bits in the downlink are information bits used for controlling uplink transmission power, pilot bits specific to the mobile station, or information bits indicating a transport format combination.

3. The mobile communication system of claim 1, wherein the power controller controls and sets the power of the control bits in the downlink when the number of wireless base stations simultaneously communicating with the mobile station is one to be smaller than power of the control bits in the downlink when the number of wireless base stations simultaneously communicating with the mobile station is not less than two.

4. The mobile communication system of claim 1, wherein the power controller determines whether to perform the power control according to a channel characteristic of uplink paired with the downlink.

5. The mobile communication system of claim 4, wherein the channel characteristic of the uplink is at least any one of a bit rate, a spreading factor, the number of codes, and TTI.

6. The mobile communication system of claim 1, wherein the power controller determines whether to perform the power control according to whether transmission diversity control is being applied to the downlink.

7. The mobile communication system of claim 6, the transmission diversity control is closed-loop transmission diversity control, which controls phases of signals to be transmitted through two antennas.

8. The mobile communication system of claim 1, wherein
at least two wireless base stations are simultaneously communicating with the mobile station, and the power controller controls the power of control bits in downlink for all of the at least two wireless base stations.

9. A wireless base station communicating with a mobile station and controlled by a radio network controller, the wireless base station comprising:
a power controller which controls a power of the control bits in the downlink based on the number of wireless base stations simultaneously communicating with the mobile station, the power controller being configured
to determine whether to perform the power control according to a channel type of the downlink, the channel type being a dedicated channel associated with a shared channel, and
to apply the power control to the dedicated channel associated with the shared channel.

10. The wireless base station of claim 9, wherein
at least two wireless base stations are simultaneously communicating with the mobile station, and the power controller controls the power of control bits in downlink for all of the at least two wireless base stations.

11. A radio network controller controlling wireless base stations, which communicate with a mobile station, the radio network controller comprising:
a power controller which controls a power of the control bits in downlink based on the number of wireless base stations simultaneously communicating with the mobile station, the power controller being configured
to determine whether to perform the power control according to a channel type of the downlink, the channel type being a dedicated channel associated with a shared channel, and
to apply the power control to the dedicated channel associated with the shared channel.

12. The radio network controller of claim 11, wherein
at least two wireless base stations are simultaneously communicating with the mobile station, and the power controller controls the power of control bits in downlink for all of the at least two wireless base stations.

13. A power control method in a mobile communication system composed of wireless base stations, a mobile station communicating with the wireless base stations, and a radio network controller controlling the wireless base station, the power control method comprising:
controlling a power of control bits in downlink based on the number of wireless base stations simultaneously communicating with the mobile station, the controlling including
determining whether to perform the power control according to a channel type of the downlink, the channel type being a dedicated channel associated with a shared channel, and
applying the power control to the dedicated channel associated with the shared channel.

14. The power control method of claim 13, wherein at least two wireless base stations are simultaneously communicating with the mobile station, and the controlling a power of control bits in downlink includes controlling the power of control bits in downlink for all of the at least two wireless base stations.

* * * * *